(12) United States Patent
Ng et al.

(10) Patent No.: US 8,620,832 B2
(45) Date of Patent: Dec. 31, 2013

(54) NETWORK-CENTRIC CARGO SECURITY SYSTEM

(75) Inventors: Joseph S. Ng, Montebello, CA (US); George W. Wells, Friendswood, TX (US); Peter S. Lauenstein, La Canada Flintridge, CA (US)

(73) Assignee: The Boeing Company, Chicago, IL (US)

( * ) Notice: Subject to any disclaimer, the term of this patent is extended or adjusted under 35 U.S.C. 154(b) by 2058 days.

(21) Appl. No.: 10/791,998

(22) Filed: Mar. 2, 2004

(65) Prior Publication Data

US 2005/0197844 A1    Sep. 8, 2005

(51) Int. Cl.
*G06Q 10/00*    (2012.01)
(52) U.S. Cl.
USPC .......................... 705/330; 705/333
(58) Field of Classification Search
USPC .............................................................. 705/1
See application file for complete search history.

(56) References Cited

U.S. PATENT DOCUMENTS

| | | | | |
|---|---|---|---|---|
| 4,340,810 A * | 7/1982 | Glass | | 235/375 |
| 5,774,876 A | 6/1998 | Woolley et al. | | |
| 6,148,291 A | 11/2000 | Radican | | |
| 6,973,385 B2 * | 12/2005 | Ulrich | | 701/207 |
| 7,098,784 B2 * | 8/2006 | Easley et al. | | 340/539.13 |
| 2003/0028388 A1 * | 2/2003 | Jorgenson | | 705/1 |
| 2003/0074334 A1 * | 4/2003 | Garfinkle et al. | | 705/500 |
| 2003/0117268 A1 * | 6/2003 | Hewitt et al. | | 340/5.92 |
| 2003/0137968 A1 * | 7/2003 | Lareau et al. | | 370/349 |
| 2003/0160695 A1 | 8/2003 | Hisano | | |
| 2003/0201394 A1 * | 10/2003 | Peoples | | 250/336.1 |
| 2004/0174259 A1 * | 9/2004 | Peel et al. | | 340/539.26 |
| 2004/0182936 A1 * | 9/2004 | Koenck et al. | | 235/472.02 |
| 2004/0257225 A1 * | 12/2004 | Webb, Sr. | | 340/539.26 |
| 2007/0008114 A1 * | 1/2007 | Webb, Sr. | | 340/539.13 |
| 2007/0023714 A1 * | 2/2007 | Bohinc | | 250/506.1 |
| 2008/0117040 A1 * | 5/2008 | Peel et al. | | 340/539.16 |

FOREIGN PATENT DOCUMENTS

WO    WO 02/061657 A1    8/2002
WO    WO 03/023439 A2    3/2003

OTHER PUBLICATIONS

PCT Search Report for PCT/US2005/005259, Aug. 18, 2005, The Boeing Co.

* cited by examiner

*Primary Examiner* — Gabrielle McCormick

(57) ABSTRACT

Network-centric systems and methods for monitoring the security of a cargo container during shipment from an origination point to a destination are described. The cargo container includes a container security unit (CSU) having an electronic container identifier. As the container is loaded with various contents, a container processing system obtains produces a manifest of the contents using wireless data collection. The manifest, which also includes the container identifier, is sent to a central server for storage. As the cargo container is shipped through a port, warehouse or other shipping location, the CSU provides a status update to the central server. The status update may include a location of the cargo container, the container identifier and a status of a door seal, hazard detector and/or the like. As the cargo container arrives at its destination, another container processing system creates an arrival report of the received contents that can be compared to the manifest at the central server. The central server may also process data from the manifest, status update(s) and/or arrival report for the cargo container to further identify any security issues arising during shipment.

7 Claims, 4 Drawing Sheets

NETWORK-CENTRIC CARGO SECURITY SYSTEM

TECHNICAL FIELD

The present invention generally relates to transportation security, and more particularly relates to systems and methods for securing cargo during transportation.

BACKGROUND

Because a significant portion of the import and export trade is dependent upon cargo containers, securing the transportation infrastructure continues to be a focus of the private and public sectors. Numerous configurations of cargo containers are available for transportation of goods, including crates, boxes, or the like that exhibit myriad shapes and dimensions. Such containers are used to transport goods and/or passengers in any manner, including via land, water, space or air vehicles including automobiles, trucks, vans, trains, rail cars, aircraft, ships, barges, trailers and/or the like. Although over six million cargo containers enter the country each year, a relatively small percentage can be physically inspected by customs or other government agents. As a result, various forms of contraband including illegal drugs, weapons, undocumented immigrants and the like are continually smuggled across geopolitical boundaries. Such illegal activities can have undesirable impacts on society, and in a worst case may threaten national security. Accordingly, reducing such illegal activities has vast benefits and is highly desirable.

It is therefore desirable to provide a system for improving the security of cargo containers throughout the transportation chain. In addition, it is desirable to provide methods for securing the chain of transport from origination to destination. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, network-centric systems and methods for monitoring the security of a cargo container during shipment from an origination point to a destination are described.

In one aspect, a security system operating in communication with a digital network for monitoring the security of a cargo container during shipment from an origination point to a destination suitably includes any number of container processing systems and status systems, as well as a central server. The cargo container suitably includes a container security unit (CSU) that provides a container status and a container identifier. The container processing systems each have a report generator and an interface to the digital network. The report generator compiles a manifest of contents placed in the cargo container along with the container identifier. Each of the container status systems suitably include an interface to the digital network and a wireless interface to communicate with the CSU to thereby obtain the container identifier and the container status during shipment of the cargo container. The central server communicates with the plurality of container processing systems and the plurality of container status systems via the digital network to monitor the cargo container from the origination point to the destination and to identify any security issues arising during shipment of the cargo container.

In another aspect, a method is executable for maintaining the security of a cargo container during shipment from an origination point to a destination. The method includes the broad steps of preparing an electronic manifest for the cargo container, obtaining electronic updates from the container during shipment, compiling an arrival report upon receipt of the container, and processing the manifest, updates and/or arrival report to verify the contents of the shipment and/or to identify any security issues that arose during shipment. In various further embodiments, data obtained by a central server is processed to identify obvious and/or non-obvious relationships, to recognize patterns or otherwise to assess risks posed by containers or other aspects of the shipping chain.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, network-centric systems and methods for monitoring the security of a cargo container during shipment from an origination point to a destination are described. A worldwide secure data network is provided to enhance information availability to supply chain participants, authorized government agencies and/or other interested parties. In addition to the network-centric security system, various further embodiments provide business processes, technologies and initiatives to protect commercial, military and/or other shipments from threats of terrorist attack, weapons of mass destruction, smuggling and/or contraband while minimizing the economic impact upon the transportation system. Moreover, the concepts described herein may be further used to reduce product losses during shipping and/or to improve tracking of shipping containers. Further, in the event of container intrusion, various embodiments of the system provide forensics information to allow investigators to track the time and location of the intrusion. Various other embodiments provide additional features and benefits, as described herein.

Figure 1:
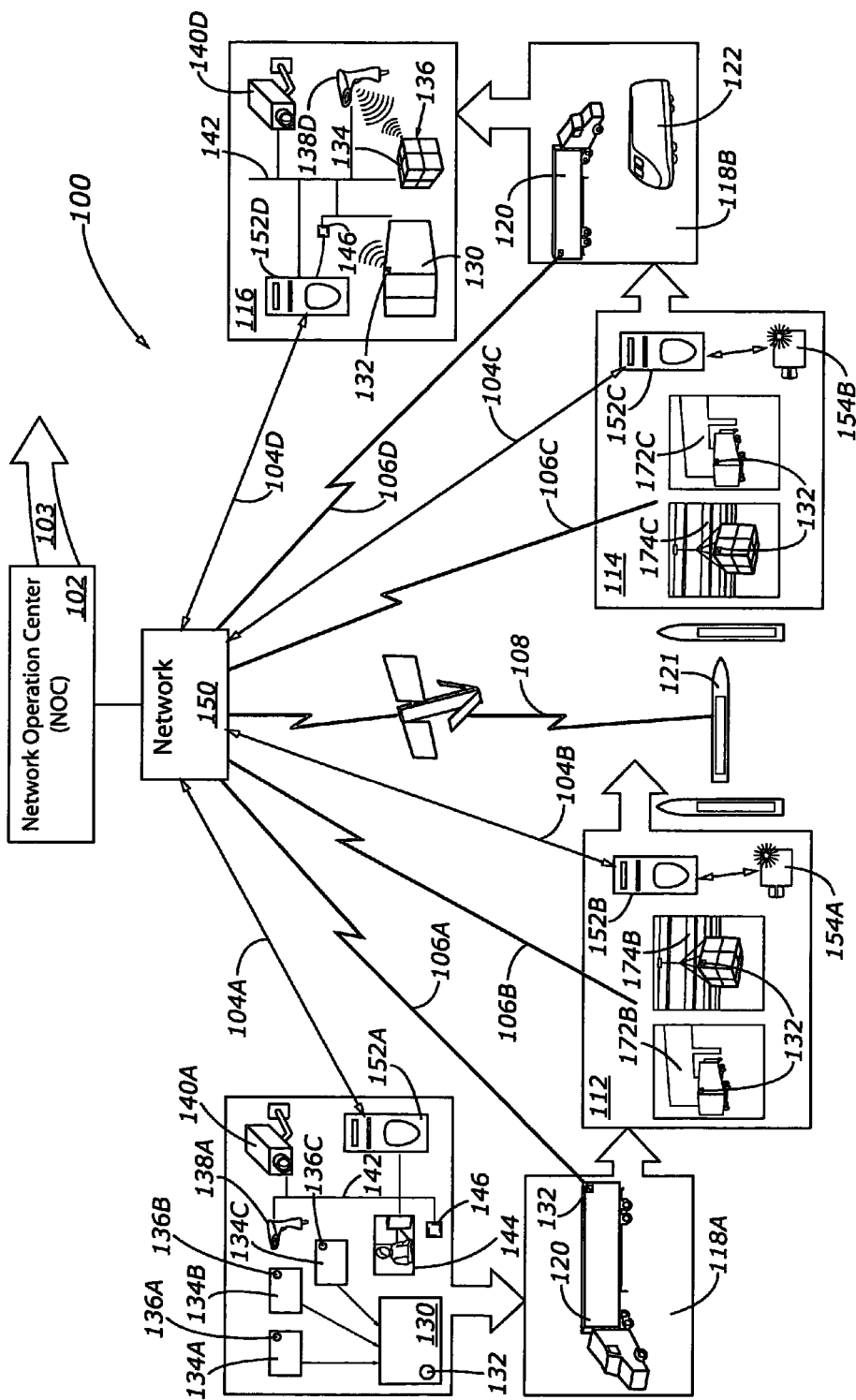
FIG. 1 a block diagram of an exemplary transportation security system.

Turning now to the drawing figures and with initial reference to FIG. 1, an exemplary system 100 for monitoring container 130 throughout a transportation system suitably includes a network operation center (NOC) 102, one or more container processing systems 110, 116 associated with an origination point and/or destination for goods being transported, and one or more container status systems 112, 114 associated with ports, warehouses and/or other waypoints for transporting goods. Each of the container processing systems 110, 116 and container status systems 112, 114 suitably communicates with NOC 102 via network 150 as appropriate to provide data obtained from the shipping channel to NOC 102 for processing. NOC 102 may also communicate with other parties via various secure connections 103, as appropriate.

In the example shown in FIG. 1, cargo container 130 suitably transports items 134A-C between container processing systems 110, 116 located at origination and destination points for container 130, respectively. Container 130 is suitably transported from origination point 110 to port 112 via terrestrial transport 118A (e.g. truck 120 or train 122). Container 130 is then loaded onto a ship 121 at port 112 for transport to destination port 114. Container 130 then completes its journey from port 114 to destination 116 via terrestrial transport 118B. This exemplary transportation scenario is intended for illustrative purposes only; in various practical implementations, container 130 may be shipped via any number of terrestrial, air and/or water-based connection legs between any number of terminals, waypoints or other temporary destinations.

Cargo container 130 is any type of box, crate, carton, or other enclosure capable of use in transporting goods from one place to another. Various types of standardized cargo containers are described by, for example, the Imperial Trade Commission's various Standard Cargo Container Specifications, although any type of standard or non-standard cargo containers could be used with the various embodiments. Indeed, cargo container 103 may be implemented with any number of standardized or specialized enclosures, crates, boxes, or the like, having any shape and dimensions. Alternatively, the concepts and structures described herein as applying to cargo containers could equivalently provide security for passenger and/or cargo compartments of land, water, space and/or air vehicles (e.g., automobiles, trucks, vans, trains, rail cars, aircraft, ships, barges, trailers and/or the like), whether or not such vehicle has an integrated propulsion system, or may be used to secure any other goods, environments or the like.

Each cargo container suitably includes a container security unit (CSU) 132 and a container seal 133. Container seal 133 is any device capable of securely locking of fastening container 130. In various embodiments, seal 133 further includes radio frequency identification (RFID) or other wireless capability for electronically transmitting the status of seal 133 to CSU 132, to a wireless receiver, or the like.

Container security unit 132 is any device capable of gathering and/or storing information about the security of container 130 and of communicating directly or indirectly with NOC 102, as described more fully below. CSU 132 suitably maintains an electronic code or identifier that is capable of uniquely identify the container within system 100. Such a code may be implemented with a conventional electronic serial number or other alphanumeric identifier, for example, or may be implemented with a digital signature or other electronic credential. In various embodiments, CSU 132 further includes position sensing circuitry (e.g. a global positioning system (GPS) receiver) and one or more communications circuits, such as a cellular phone and/or a low power wireless networking transceiver such as an IEEE 802.11, IEEE 1394 or other transceiver. In such embodiments, CSU 132 is operable to communicate with NOC 102 via a communications link 104, 106 as appropriate for the location (e.g. geozone), motion or other status of container 130. CSU 132 may operate in low-power wireless mode when located in a port or packing facility, for example, or may operate in a higher-power communications mode (e.g. cellular, satellite, etc.) while container 130 is in transit. Various CSUs 132 and electronic seals 133 having widely varying capabilities and resources are available commercially from multiple sources.

Various embodiments of container 130 suitably enclose one or more cargo items 134A-C as appropriate. Each item 134 corresponds to a product or other that is shipped within container 130. In various embodiments, each item 134A-C entering container 130 suitably includes a wireless tag 136A-C as appropriate. Tags 136A-C are any type of chip, tag, transponder or other device capable or providing information about item 134A-C in any manner. In an exemplary embodiment, tags 136A-C are RFID tags such as those provided by numerous merchants. RFID tags 136A-C suitably contain an electronic identifier that may be provided in a wireless manner to an RFID reader, as described more fully below. Each identifier may be any numerical or other digital code such as an electronic product code (EPC), serial number and/or the like. In various embodiments, each tag 136A-C has a unique bit sequence or other identifier that can be associated with a particular product, item or container as appropriate. EPC codes, for example, are typically ninety-six bits in length, including a forty bit serial number, and are used to identify various products and items in the stream of commerce according to standards promulgated by the Uniform Code Council (UCC).

While the exemplary embodiment of FIG. 1 describes each item 134A-C as corresponding to a box or case of goods, in other embodiments some or all of items 134 may correspond to individual items, cartons, and/or other enclosures of products. Examples of "items" 134 may therefore include packages, packets, boxes, cases, crates, cartons, envelopes, shrink-wrapped or cellophane packaging and/or the like. In an embodiment wherein container 130 transports various pallets of goods, for example, with each pallet containing several cases of items, any or all of the pallet, case and/or item may be considered an "item" 134 as described herein. Each "item" 134 may further possess its own tag 136 to allow system 100 to track goods on a "per item", "per case", "per pallet" and/or "per container" basis, as appropriate. Each cargo container 130 may contain any number of items 134 in a wide array of alternate embodiments.

Network operations center (NOC) 102 is any central server, processing center, data repository or the like capable of receiving data from the various container processing and/or status systems 110, 112, 114 and 116 via network 150. Network 150 is any collection of data links 104, 106 and/or 108 that allows containers 130 to remain in direct or indirect communication with NOC 102. As shown in FIG. 1, network 150 is intended to collectively encompass all of the various data links 104, 106 and/or 108. NOC 102 suitably obtains packing information, status information, arrival information and/or the like via network 150 to identify changes in the contents of container 130, intrusions into container 130 and/or other events during shipment. Moreover, various further embodiments of NOC 102 additionally include data mining software or the like to identify non-obvious relationships, risk patterns and/or issues to thereby identify those cargo containers posing greater risks than other containers. NOC 102 may also provide other functions, as described below, such as communicating with shippers, insurers, customer or other government officials and/or other interested parties through secure links 103.

Container processing systems 110, 116 are any data processing systems capable of gathering data about the contents of container 130 either before and/or after shipment. In the exemplary embodiment shown in FIG. 1, container processing system 110 corresponds to a manufacturer or other shipping origination point for container 130, and container processing system 116 corresponds to a warehouse/or other destination point for container 130. In alternate embodiments, container processing systems 110, 116 may be located at manufacturing facilities, packing facilities, shipping originators, warehouses, retail locations and/or any other locations where cargo containers 130 are loaded and/or unloaded. Although the discussion below frequently describes the container processing systems 110, 116 located at both the origination and receiving points as being largely identical, other embodiments may include variances between shipping and receiving locations as appropriate.

Container processing systems 110, 116 suitably include an interface 152 to network 150, a manifest generation/report generation system 144 and communications equipment 138, 146 for communicating with items 134 and containers 130, respectively. Wireless reader 138 is any RFID or other reader capable of communicating with tags 136 as appropriate. Similarly, CSU bridge 146 is any IEEE 802.11, IEEE 1392 and/or other transceiver capable of communicating with CSU 132 in a wireless manner. Container processing systems 110, 116 may further include optional camera equipment 140, as described below.

Interface 152 is any computer, router, gateway, firewall, application/process or other hardware and/or software capable of securely facilitating communications between container processing system 110, 116 and NOC 102 via network 150. In various embodiments, interface 152 is a conventional personal computer having client software installed thereon to create a virtual private network connection 104 with NOC 102 via network 150, although other embodiments may use other technologies as appropriate. Although the exemplary embodiment of FIG. 1 shows interface 152 as providing a secure connection 104 between local area network 142 and network 150, other embodiments will use different network topologies, arrangements or other structures as appropriate.

Report generation system 144 suitably communicates with tags 136A-C and with CSU 132 as appropriate to obtain data and/or to create reports that can be transmitted to NOC 102 via interface 152. Although shown as separate systems in FIG. 1, in practice report generation system 144 and interface 152 may be implemented on a common personal computer or other data processing system. Reports that may be created by various report generation systems 144 include shipping manifests, arrival reports and the like.

Figure 2:
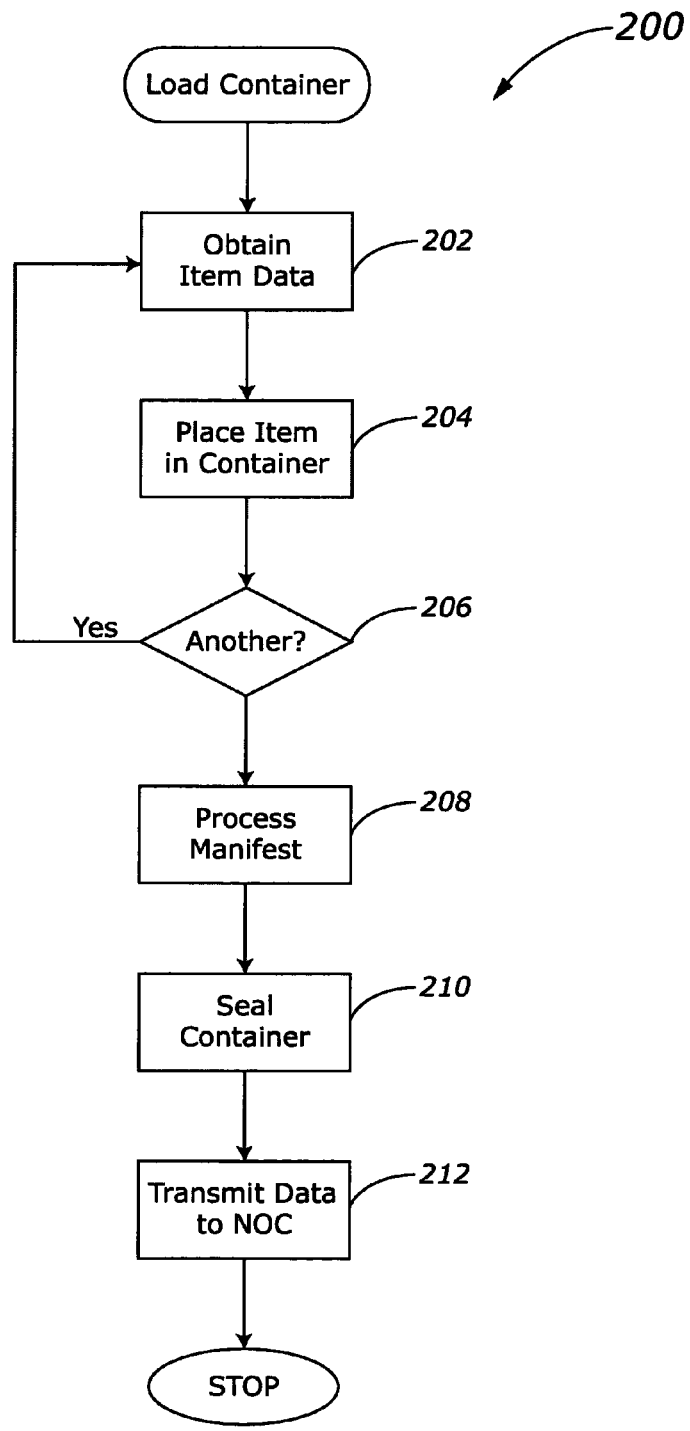
FIG. 2 is a flowchart of an exemplary process for loading a secure container.

To create a shipping manifest or other similar report, container processing system 110 suitably maintains an accounting of items 134A-C entering and/or leaving container 130. With momentary reference to FIG. 2, an exemplary process 200 for loading a container 103 is described in flowchart form. One method 200 of tracking items 136A-C involves reading tags 136A-C (step 202) as the items are placed in or out of container 130 (step 204). Tags 136A-C may be read through any appropriate technique. In an exemplary embodiment, a wireless reader 138 suitably obtains the tag identification number (e.g. EPC code) from each tag 136 as items 134 are moved. Report generation system 144 obtains the tag identifier information from reader 138 as appropriate, and creates a shipping manifest therefrom (step 208). Report generation system 144 also obtains the container identifier from CSU 132 via CSU bridge 146 as appropriate, for inclusion in the manifest.

Optionally, video images of the loading and/or unloading of items 136 from container 130 may be obtained through camera 140. In various embodiments, camera 140 is a digital camera capable of obtaining motion or still pictures of items 136 and/or personnel involved in the loading/unloading process. Such video images may be embedded within the manifest for container 130 and/or provided to NOC 102 in any other manner.

The manifest report prepared by report generation system 144 therefore includes an accounting of items placed within container 130, along with the container identifier and optional digital image data. After loading of container 130 is complete, seal 133 on container 130 is appropriately locked (step 210) to prevent tampering with, addition of or removal of items. Seal 133 may be locked, for example, by providing an appropriate wireless signal to an RFID or other receiver associated with the seal. The time and/or location of seal activation may be included in the manifest. The manifest may also include other data as well, such as location and/or date of origin, expected arrival date and location and/or the like. The manifest is formatted in any appropriate manner (e.g. as an extensible markup language (XML) file or the like), and may be encrypted, compressed and/or otherwise processed as appropriate prior to transfer to NOC 102 (step 212). Additionally, some or all of the manifest may be optionally stored on CSU 132 for retrieval and/or checking of the contents of container 130 during transit.

Process 200 is intended as merely exemplary in nature. Accordingly, other processes 200 for loading container 130 may execute the various steps in another temporal order, and/or may include additional or alternate processing steps. Further, an exemplary unloading process may operate in approximately reverse order to that set forth in FIG. 2, with the receiver unsealing container 130, obtaining RFID or other tag information from each of the items 134 contained within container 130. The tag information may be further compiled into a manifest-like arrival report that can be compared with the shipping manifest to determine any discrepancies between items shipped and items received. The comparison may be performed at NOC 102, at receiving location 116, or at any other appropriate location.

With continued reference now to FIG. 1, loaded containers 130 are transported away from origination point 110 in any manner, using any form of transportation. In the exemplary embodiment shown in FIG. 1, the first leg of transport for container 130 is a transfer to a port 112 via terrestrial-based transportation 118 such as a truck 120, rail car 122, or the like. While container 130 is in transit, CSU 132 suitably enters a transit mode that allows communication with the NOC 102 via cellular, satellite and/or another link 106. CSU appropriately provides periodic or aperiodic updates as to the location and/or status of container 130. The period of such updates may be selected to be any appropriate period (e.g. any number of seconds, minutes, hours or even days as appropriate) and may vary depending on the status of container 130 (e.g. where the container is located, whether the container is located on a vehicle or in a port, whether the vehicle is moving, etc.). Although information provided in such updates varies from embodiment to embodiment, exemplary information may include location (e.g. GPS coordinates), status of container 130 (e.g. "moving"/"not moving"), as well as any available security information. Such information will depend upon the particular CSU 132, but may include information as to the status of lock 133 (e.g. obtained via RFID wireless techniques), presence of any hazardous materials detected by sensors communicating with CSU 132, and/or the like. In the event of a security breach, for example, CSU 132 may immediately contact NOC 102 so that proper authorities may be rapidly contacted. Again, the particular data processing capabilities and techniques used by various CSUs 132 will vary from embodiment to embodiment.

As mentioned above, container 130 may be transferred along any number of terrestrial, air and/or sea links before reaching destination 116 in a wide array of alternate embodiments. Container 130 remains in contact with NOC 102 during each leg of transit by any appropriate data channel, such a cellular link 106, wireless data networking link and/or satellite link 108 as appropriate. Such contact may be direct (e.g. via a cellular phone link 106 between CSU 132 and NOC 102) and/or indirect, taking place through an intermediary system. When container 130 is located near a container processing system 110, 116, for example, CSU 130 suitably communicates via a low-power wireless network connection with a CSU bridge 146. CSU bridges 146 may also be present in ship holds, trucks and/or other environments where cellular or other direct links 106 may not be available due to electromagnetic shielding, remote locations, and/or any other factors. Although not shown in FIG. 1, for example, ship 121 may include a CSU bridge 146 to allow the various CSUs 132 operating within the ship's cargo hold to share a satellite or other communications link 108 as appropriate. CSU bridge 146 may also provide GPS or other positional information to CSUs 132 when such information may not be directly available to CSU 132. Accordingly, CSU 132 adapts to receive and provide direct and/or indirect communications to NOC 102 according to the environment surrounding container 130 as appropriate.

Network interfaces 152B-C may also be present in ports, shipping yards and/or other environments having container status systems 112, 114. Interfaces 152 may be used in any manner. In the exemplary embodiment shown in FIG. 1, for example, interfaces 152 are shown providing secure communications between NOC 102 and a hazard sensor 154. Such hazard sensors 154 may detect, for example, one or more types of chemical, biological, nuclear, radiological, explosive (CBNRE) and/or other hazards. Such information may be obtained through physical sensors, for example, and/or may be provided through human data entry following detection through other means (e.g. canines or other animals capable of sensing various forms of contraband). Status systems 112, 114 may also include a CSU bridge 146 for communicating with the various CSUs 132 passing through systems 112, 114. CSU bridges 146 may be located, for example, in an entry, door or other portal 172 and/or on a crane, forklift or other device 174 capable of moving container 130 from one location to another. Interface 152 may also provide status information or other data from CSU 132 to NOC 102 as appropriate. Typically, hazard information and/or status information provided to NOC 102 is accompanied by the container identifier obtained through CSU 132 so that the more-recently obtained data can be matched to the manifest and/or other information previously received at NOC 102 regarding that container 130.

As shown in FIG. 1, then, system 100 suitably allows network operating center 102 to remain in relatively constant contact with various containers 130 during transport. NOC 102 appropriately obtains a shipping manifest (optionally including digital imagery) as the container 130 is packed, obtains status updates from CSU 132 as container 130 is in transit, and obtains an arrival report as container 130 is unloaded to thereby verify that the contents of container 130 have not altered during shipment. Moreover, NOC 102 may use the data obtained about the container to predict further threats, as appropriate, and/or to assist shippers, cargo owners, insurers and the like with tracking and ensuring the security of goods being shipped.

Figure 3:
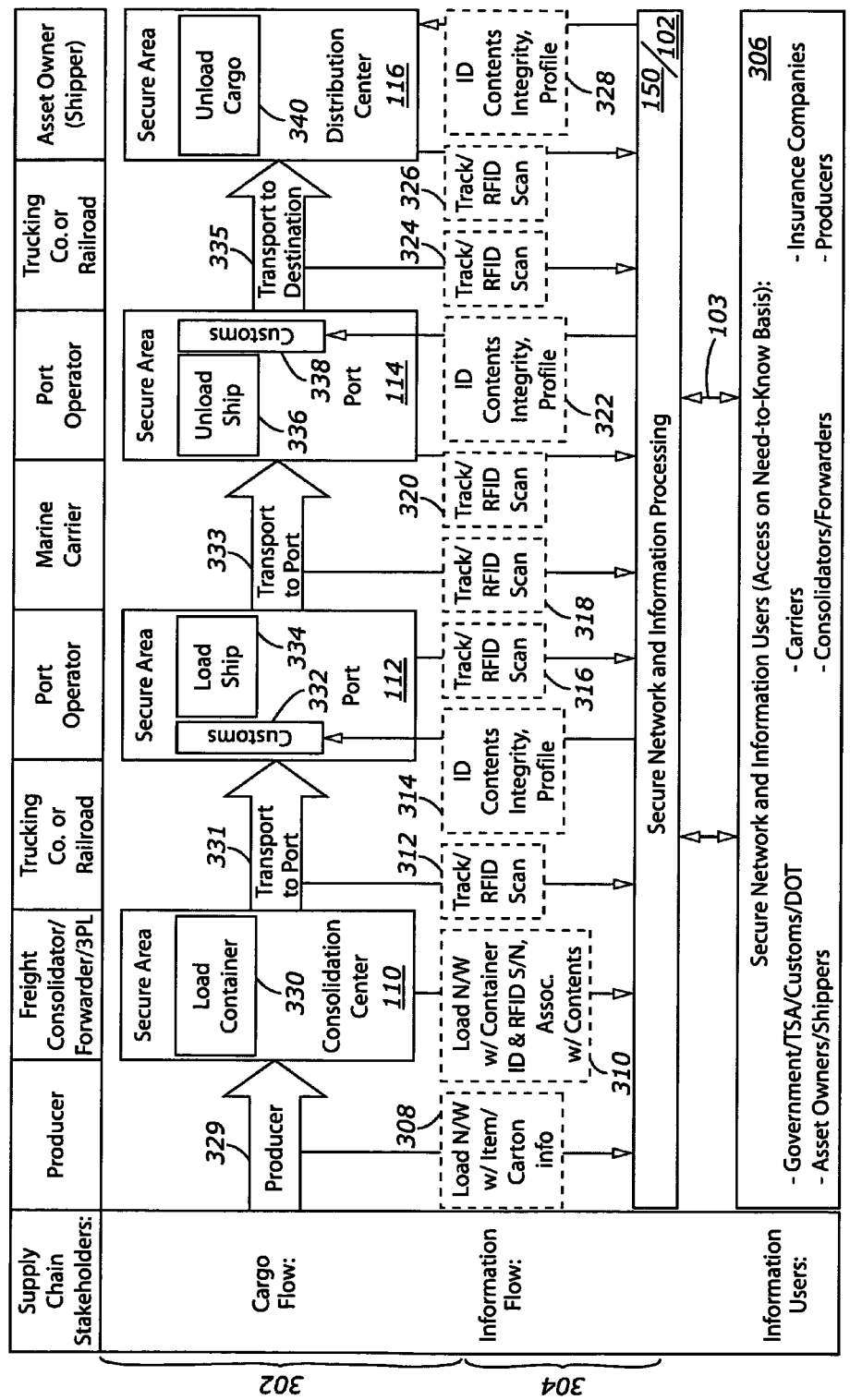
FIG. 3 is a diagram showing exemplary flows of cargo and information through an exemplary transportation scenario.

Exemplary processes 302 and 304 for cargo flow and data flow, respectively, are shown in FIG. 3. With reference now to FIG. 3, cargo flow process 302 suitably includes the broad steps of loading container 130 (step 330) at origination point 110, transporting container 130 to a port operator via terrestrial transport (step 331), loading container 130 onto a marine carrier 121 (step 334) for transport between port 112 and port 114 (step 333), and transporting container 130 to destination 116 (step 335). The container may also be inspected by a customs official or other agent (steps 332, 338) at port 112, port 114 and/or at any other point during transportation. Information flow process 304 operates concurrently with cargo flow process 302, and suitably includes the broad steps of proving a shipping manifest (step 310) at the origination point, tracking the container during transit (steps 312, 316, 318, 320 and 324). At the destination, an arrival report 326 may be provided to NOC 302, and/or data from the original shipping manifest may be provided to the destination container processing system 116 (step 328) to verify the contents and integrity of container 130. For ease in understanding, the exemplary processes 302, 304 shown in FIG. 3 closely parallel the exemplary shipping scenario set forth in FIG. 1. It will be appreciated that the concepts set forth in FIG. 3 are intended as merely illustrative, and may be readily adapted and applied to any transport security system 100 and/or may be used in any shipping scenario having any number of terrestrial, seaborne, airborne or other shipping legs.

NOC 102 suitably receives data via network 150 from container 130 during the various stages of transport. As shown in FIG. 3, serial number or other information from items 134A-C may be optionally provided to NOC by producer 329 to NOC 102. Such information may be stored within a database at NOC 102 prior to loading within a container 130 at consolidation center 110. Such information may include, for example, RFID tag information, serial number information, and/or the like. As the container is loaded (step 330), container processing system 110 suitably creates a manifest (e.g. using process 200 shown above) and provides the manifest 310 to NOC 102 as appropriate. As described above, manifest 310 suitably includes a listing of the container contents (e.g. obtained from RFID tags 306A-C), the container identification from CSU 132, optional video data and/or other information.

As container 130 progresses through the supply chain, updates are provided from CSU 132 to NOC 102 through any direct or indirect channel, as described above. Updates may include, for example, the container identification, status information, hazard reports, container location data and/or the like. In various further embodiments, some or all of the subsequent updates may include a verification of the manifest obtained by, for example, scanning each of the RFID tags 136A-C associated with the various items 134A-C in container 130. Alternatively, RFID techniques may be used to verify the seal 133 on container 130 to ensure that container 130 has not been compromised since the seal was locked.

NOC 102 is not limited to merely receiving data. In various embodiments, NOC 102 provides appropriate data to customs officials 332, 338 or other authorities to allow verification of the shipping manifest or other data. As shown in FIG. 3, for example, NOC 102 provides verification information 314, 322 to officials 332, 338 (respectively) to allow the officials to review the contents of container 130 (using manual techniques, RFID techniques, or the like) and verify that the contents have not changed during transit. Moreover, NOC 102 is shown in FIG. 3 as providing a contents profile to the container processing system 116 located at the destination for container 130 to allow processing system 116 to verify the integrity of the contents of container 130. In alternate embodiments, processing system 116 provides an arrival report 326 that includes an RFID scan or other accounting of the contents received in container 130, and NOC 102 performs the integrity check without providing the manifest to system 116.

Further, various other information users 306 may have access to information gathered at NOC 102. Information may be shared between various governmental agencies (e.g. homeland security, transportation, customs, terminal service authority, law enforcement, etc.), as well as between authorized private entities such as shippers, asset owners, carriers, consolidators/forwarders, insurers, manufacturers and/or other interested parties. Access by such parties may be provided by secure links 103, which may be dedicated network connections and/or secure connections through network 150 as appropriate. Access to data in NOC 102 may be restricted using cryptographic, biometric, userid/password, digital credential and/or other access control mechanisms to prevent unauthorized use. Moreover, access to such information may be provided for a fee. Users could be charged, for example, a flat amount for daily/weekly/monthly/annual access to the service, and/or could be charged on a per connection basis, as appropriate. Alternatively, free or reduced fee access to the data contained within NOC 102 could be provided as an incentive to shippers, producers and/or other parties to participate within system 100.

Accordingly, NOC 102 suitably obtains information from and about container 130 during various phases of transport from a point of origin to a destination. This information may be provided as needed or desired to secured parties, and may be further used to evaluate the threat level posed by the various containers 130, as described more fully below.

Figure 4:
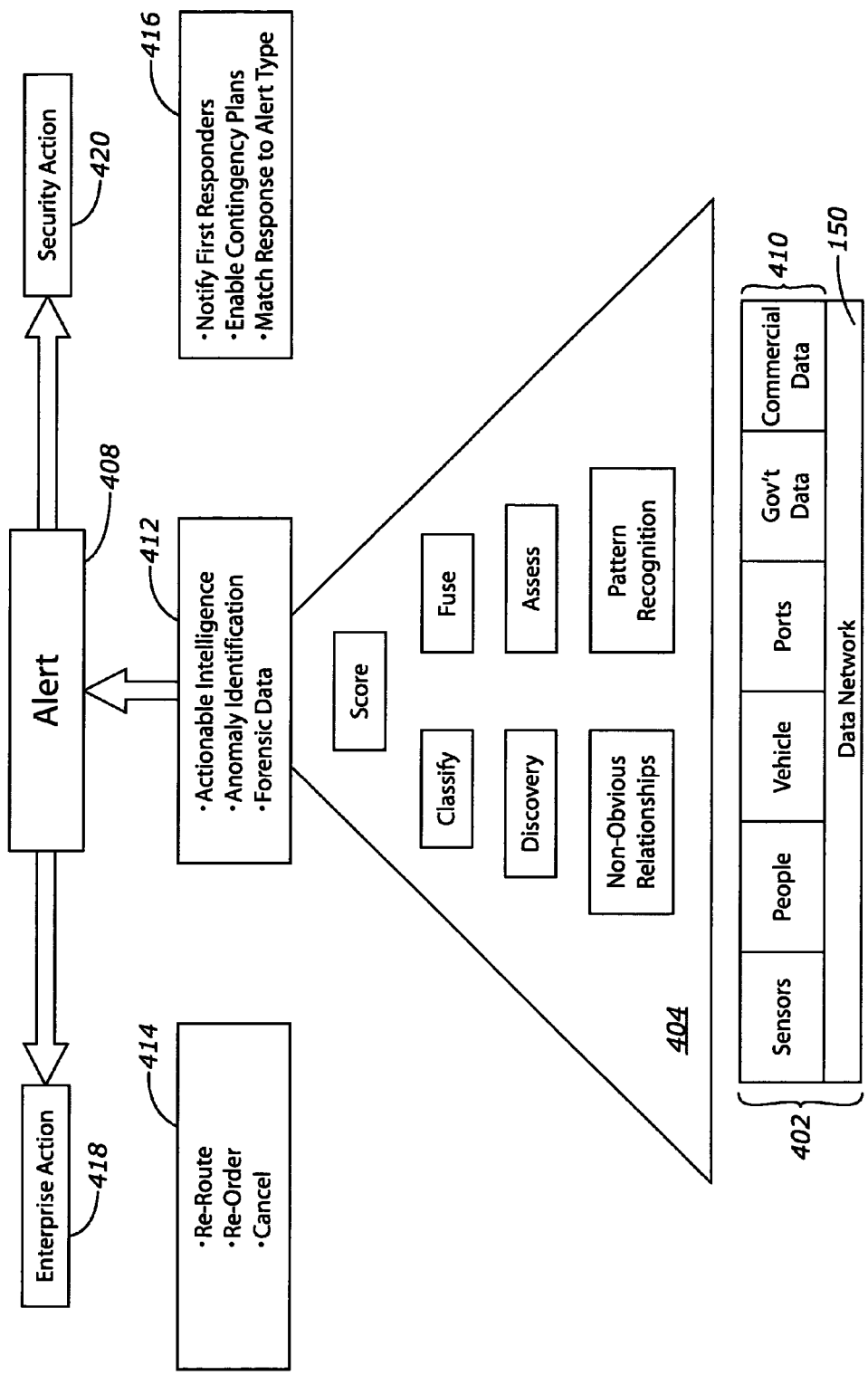
FIG. 4 is a block diagram of an exemplary architecture for processing acquired data to generate enterprise and/or security alerts.

With reference now to FIG. 4, an exemplary processing model 400 executed at network operation center 102 (FIG. 1) suitably processes data 402 using a risk analysis module 404 to identify situations 412 that result in an alert 408. Alerts 408 may result in security action 420, and/or in action by a commercial or other non-governmental enterprise 418 as appropriate.

Information 402 suitably includes any data 410 received via network 150 or any other source. Data 410 includes information gained from hazard sensors, data contained within manifests 310, shipping updates, arrival reports 326 or the like, and/or data from any other source. Data 410 may also include historical data regarding environments, personnel, vessels, etc. that may have posed threats in the past, as well as any intelligence data that may be available regarding current or future threats. Such information may be organized in any fashion such as in a relational, hierarchical or object oriented data base, or in any other manner.

Data 402 is processed as appropriate to identify any security risks or other events that would necessitate a response or alert 408. As described above, shipping manifest data may be compared against arrival report data to identify any discrepancies. If discrepancies are found, an alert may be triggered to further investigate. Similarly, if a container seal 133 is broken during transit or if a hazard detector 154 identifies a threat associated with a container 130, an alert may be readily generated to either further monitor the container 130 and/or to intercept and inspect the container 130 prior to further transport. Still further, in the event of a breach or other event, NOC 102 contains forensics data that can be used to track how, when, where and/or by whom the breach occurred.

Even if discrepancies or immediate threats are not readily identified, however, further processing of data 402 may lead to better analysis of threats posed within the transportation system. By obtaining data about container origins, paths, destinations, contents, etc., non-obvious relationships may be determined to discover threat patterns that were not previously apparent. Delays or path deviations during shipping, for example, can be identified as posing a potential risk. Similarly, threat patterns may be identified by assessing and fusing information from multiple containers, ports, etc. Such analysis may be conducted using conventional data mining or other data processing techniques. Examples of factors that may be considered include chain of custody, shipper/carrier history, crew risk, container content, vessel movement/lack of movement, supply chain anomalies, port risks, vessel history and/or other factors as may be appropriate.

As new data about threat patterns and relationships is discovered, the various elements of system 100 (e.g. containers, ports, vessels, etc.) may be classified and/or scored to assess the level of threat presented. Containers or vessels that have passed through environments known to pose additional risks, for example, may be scored differently than containers that have passed through only relatively safe environs. Again, scoring can be adjusted based upon historical data, current intelligence and/or other factors.

For containers having a score corresponding to a relatively high threat level, system 400 suitably triggers an alert 408 as appropriate. Such alerts may relate to security alerts 420, enterprise alerts 418 and/or the like. Security alerts 420 typically give rise to security-related actions 416 such as notifying first responders, enabling contingency plans in the event of extreme hazards, or other responses as may be appropriate. Enterprise actions 414 may include re-routing a shipment, re-ordering goods that have been lost or waylayed, notifying a retailer of expected delays, canceling an order and/or the like. Enterprise actions 414 may be triggered by any factors, and need not be tied to threat levels or scoring in all embodiments.

Accordingly, a network-centric cargo security system is described that enhances availability of supply-chain data to chain participants and/or government agencies. The system allows tracking of containers throughout the chain, and allows the integrity of the container to be verified from the origin point to the destination. Moreover the system allows for improved security by reducing threats of terrorist attack, weapons of mass destruction, smuggling, contraband, etc. Further, in the event of an attack or other security breach, the system maintains data that can be used to track the cause and conditions leading to the breach, thereby providing forensics data for investigating undesired events.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for maintaining security of a cargo container during shipment from an origination point to a destination, the system comprising:
   means for determining geographic location of the cargo container during shipment from the origination point to the destination; and
   a battery-powered container security unit (CSU) for the container, the CSU reporting on status of the cargo container during the shipment, wherein frequency of the reporting is a function of the geographic location of the container.

2. A system for maintaining security of a cargo container during shipment from an origination point to a destination, the system comprising:
- a device for determining geographic location of the cargo container during shipment from the origination point to the destination; and
- a battery-powered container security unit (CSU) for the container, the CSU reporting on status of the cargo container during the shipment, wherein frequency of the reporting is a function of the geographic location of the container;
- the CSU operating in a high power communications mode during transit to communicate with a network operations center;
- the CSU switching to a low power wireless network mode to communicate with the network operations center when wireless network communication is available.

3. The system of claim 2, further comprising a CSU bridge for extending range of the wireless network communication so the CSU can operate longer in the low-power wireless network mode.

4. The system of claim 3, further comprising means for moving cargo containers, the CSU bridge attached to the cargo-moving means.

5. The system of claim 3, wherein the CSU bridge is located in a location where direct communication links are not available.

6. The system of claim 3, wherein the CSU bridge provides positional information to the CSU.

7. A system comprising:
- a cargo container; and
- battery-powered security means for maintaining security of the container during shipment from an origination point to a destination;
- the security means reporting on status of the cargo container during the shipment, wherein frequency of the reporting is a function of the geographic location of the container;
- the security means operating in a high power communications mode to communicate with a network operations center during shipment;
- the security means switching to a low power wireless network mode to communicate with the network operations center when wireless network communication is available;
- whereby battery power is saved by switching to the wireless network mode.

* * * * *